Aug. 23, 1960 J. J. JAEGER 2,949,797
CUTTER HEAD AND COUNTERWEIGHT SUPPORT FOR MACHINE TOOLS
Filed Dec. 31, 1958 2 Sheets-Sheet 1

INVENTOR.
J. J. JAEGER
BY Joseph K. Schofield
ATTORNEY

2,949,797

2,949,797
CUTTER HEAD AND COUNTERWEIGHT SUPPORT FOR MACHINE TOOLS

Jacob J. Jaeger, Canton Center, Conn., assignor to Pratt & Whitney Company, Incorporated, West Hartford, Conn., a corporation of Delaware Filed Dec. 31, 1958, Ser. No. 784,279

4 Claims. (Cl. 77—36)

This invention relates to an improved form of precision machine tool, and more particularly to a novel construction for supporting a vertically movable cutting head and its counterweight.

An object of primary importance of the invention is to provide guiding ways on a column for a large and heavy vertically movable cutter head for a boring machine, the weight of the cutter head and its counterweight being supported independently of the column.

Another object of importance of the invention is to support the weight of the cutter head and its counterweight upon a frame work surrounding and enclosing the column supported independently of the column on which the cutter head is movable.

A feature enabling the above objects to be accomplished is that the cutter head is vertically slidable on suitable ways provided on the front face of a column extending from a base of the machine tool, the column serving only to guide the cutter head.

In its preferred form the improved machine tool includes a vertical column having parallel ways upon which a cutting head is adapted for vertical displacement, supporting means for the cutter head and its counterweight being provided in the form of a frame independent of said vertical column, there being flexible means connecting the cutting head and counterweight and serving to support the cutting head and counterweight on the frame.

Accordingly, it is an object of this invention to provide an improved column type machine tool in which the weight of the cutting head and its counterweight is supported independently of the column so that deflection of the column may be reduced to a minimum.

Another object of the invention is to enclose the column for guiding the cutter head to shield the column from excessive temperature variations.

Figure 1:
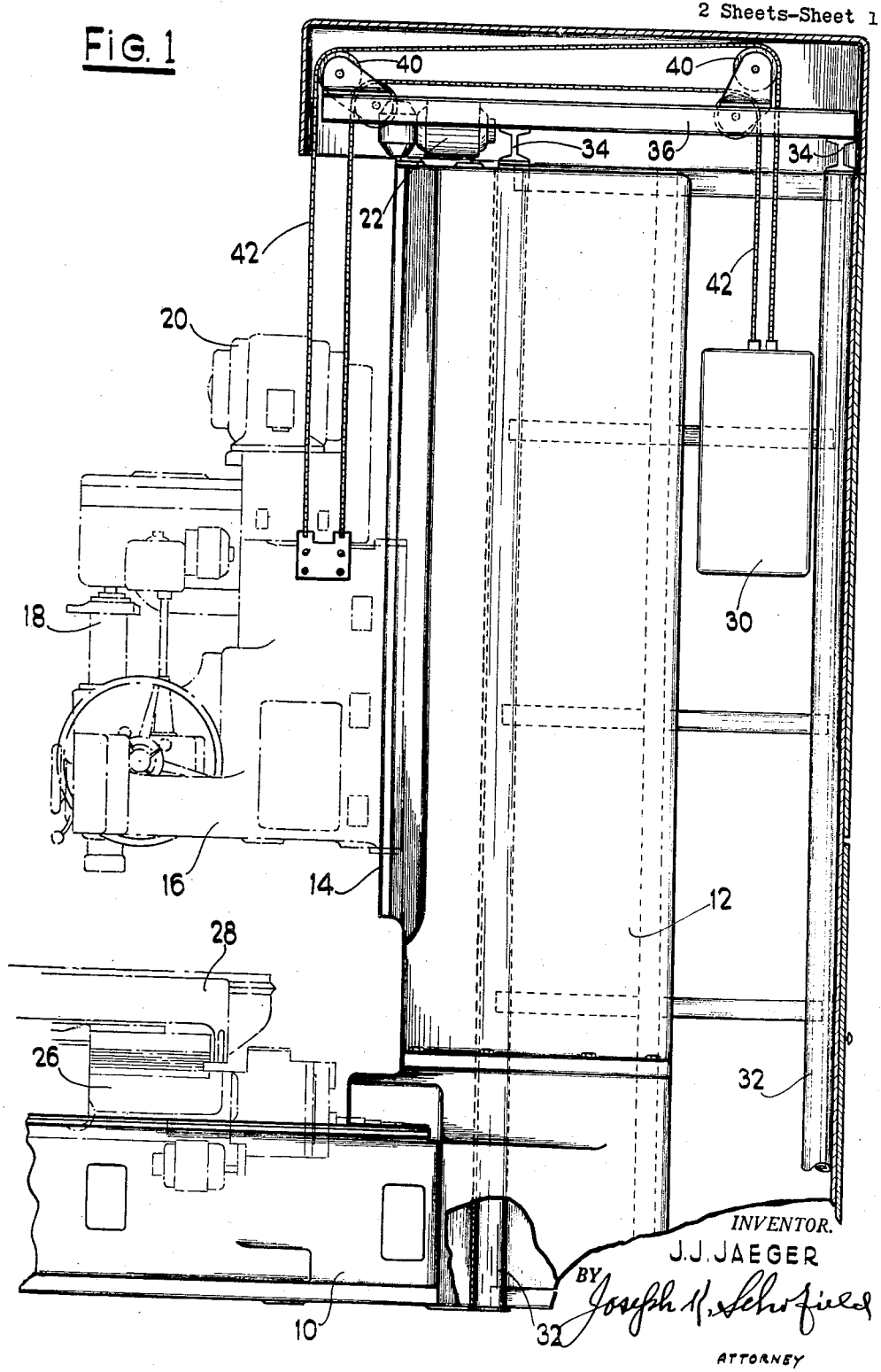
Figure 2:
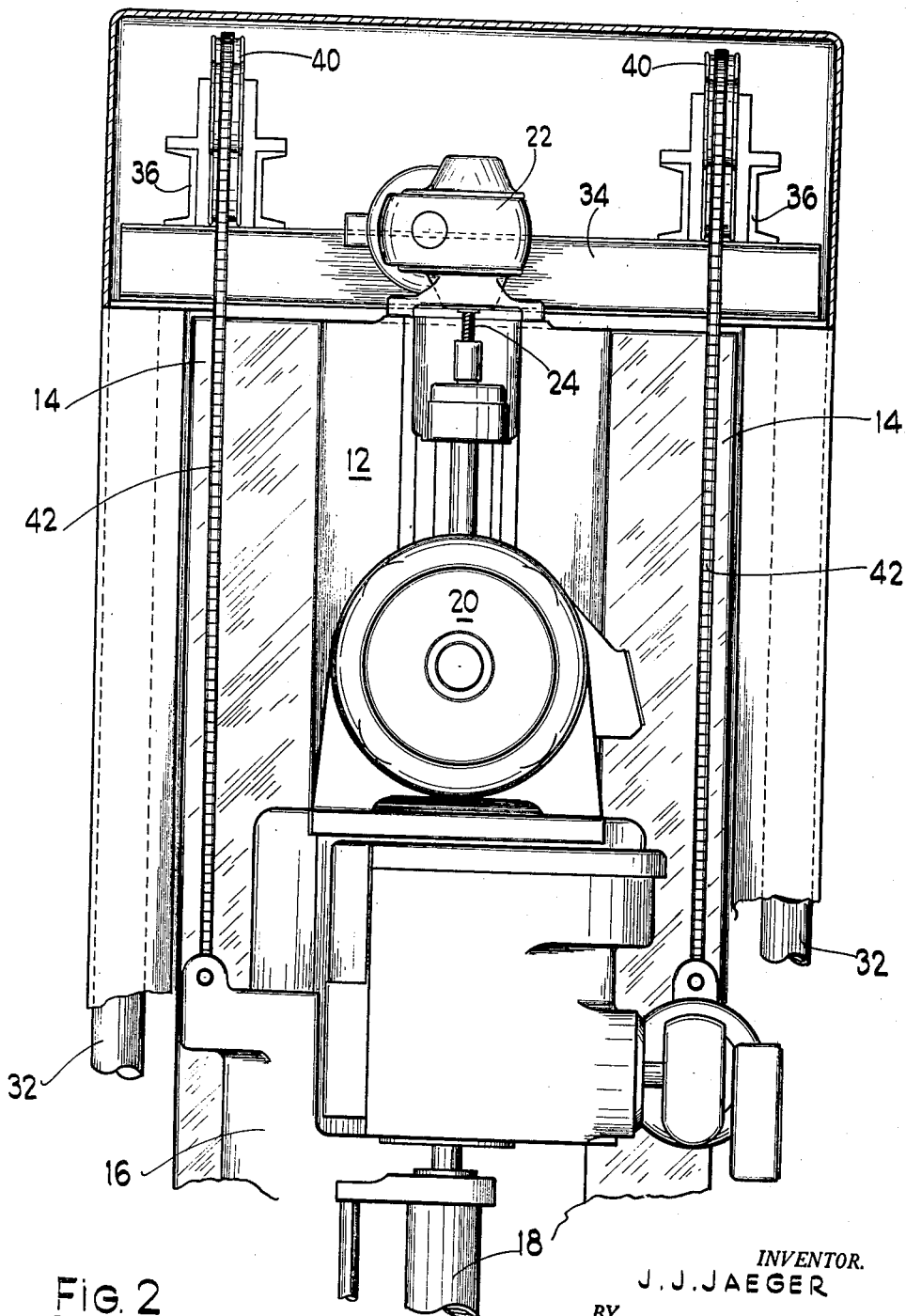

The novel features believed to be characteristic of the invention are set forth with more particularity in the appended claims. The invention itself, however, both as to its organization and method of operation, together with further objects and advantages thereof, may best be understood by reference to the following description when read in connection with the accompanying drawings in which:

Figure 1 is a side elevation of a large column type machine made in accordance with the invention; and Fig. 2 is a front elevation of the machine shown in Fig. 1.

Referring more in detail to the figures of the drawings, it will be seen that the vertical boring machine includes a base or bed 10, having a column 12 attached to a horizontal surface thereof. The column 12 has spaced-apart vertical guideways 14 formed on its forward surface. A cutter head 16 is arranged for guided slidable movement along ways 14, and within the head 16 is a rotatable cutter spindle 18 of standard form.

A motor 20 provides the necessary driving means for rotating the spindle 18.

A second motor 22 mounted on the upper end of the column 12 is coupled by suitable driving connections to the upper end of a threaded shaft 24 for raising and lowering the cutter head 16 in the usual manner. From the above description it will be apparent that a cutter or tool mounted in the lower end of spindle 18, may be rotated at predetermined speeds, and also may be moved up or down within its head 16 either manually or automatically.

On the upper horizontal surface of the bed 10 a carriage 26 is movably mounted so that it may be displaced directly toward or away from the column 12 as required. On the upper surface of the carriage 26 is a work mounting table 28, the table 28 being movable in a horizontal plane on guideways at right angles to the direction of movement of the carriage 26. As the mechanism for positioning the carriage and table forms no part of the present invention, further description of these parts is not thought necessary.

It will be understood that work pieces mounted on the upper surface of the table 28 may be positioned accurately to different positions by suitable power or manual means.

The weight of the head 16 and counterweight 30 is supported independently of the column 12 so that the head and counterweight do not add to the loading of the column 12.

Surrounding the back and sides of the column 12 is an enclosure having four spaced uprights or stanchions 32 arranged to support the weight of the head 16 and counterweight 30. Each of these stanchions 32 is provided with separate footings, only three of which appear in the figures. The front and rear pairs of uprights or stanchions 32 are connected at their upper ends by I beams 34 and above these beams 34 are forwardly extended load bearing members 36. The uprights 32 and horizontal members 34 and 36 of the enclosure are out of contact of the column 12. Enclosing the members 32 are metal panels forming the sides, back and roof of the enclosing structure.

To support the weight of the cutter head 16 and its counterweight 30 pulleys 40 are mounted on the members 36 as shown. Over these pulleys 40 extend cables or chains 42 attached at their forward ends to the cutter head 16 and at their rear ends to the counterweight 30. As shown in the figures, four chains or cables 42 are provided, two being positioned on each side of the cutter head and counterweight respectively. Each chain 42 has its own pulley 40, the position of each pulley being so chosen that the sections of the chains 42 from the pulleys to the cuter head 16 and counterweight 30 are vertical.

By the above construction all weight of both cutter head 16 and counterweight 30 is carried directly and completely by the enclosing structure supported by the uprights 32. No weight whatever of the cuter head or counterweight is carried by the column 12. The only function of the column 12 is to accurately guide the cutter head 16 during its vertical movements. Under all conditions of operation of the machine the column is free from any contact with the members of the enclosing structure.

I claim as my invention:

1. A machine tool having a base, a column thereon having vertical ways on one of its faces, a cutter head adapted for movement along said ways, a counterweight for said cutter head, a frame adjacent said base and enclosing said column, and supporting means on said frame for said cutter head and counterweight permitting vertical movements thereof, whereby said cutter head will be guided by the ways on said column and the weight of the cutter head and counterweight will be supported by said frame.

2. A machine tool having a base, a column thereon having vertical ways on one of its faces, a cutter head adapted for movement along said ways, a counterweight for said cutter head, flexible means connecting said cutter head and counterweight, a frame adjacent said base and enclosing said column and counterweight, and supporting means on said frame for the weight of said cutter head and counterweight, said frame being supported independently of said base and column.

3. A machine tool having a base, a column thereon having vertical ways on one of its faces, a cutter head adapted for movement along said ways, a counterweight for said cutter head, flexible means connecting said cutter head and counterweight, a frame adjacent said base and enclosing said column, and pulleys mounted on said frame over which said flexible means extend, whereby the weight of said cutter head and counterweight will be carried by said frame.

4. A machine tool having a base, a column thereon having vertical ways on one of its faces, a cutter head adapted for movement along said ways, a counterweight for said cutter head, a frame adjacent said base and enclosing said column, said frame having supporting means for said cutter and counterweight, permitting vertical movements thereof and enclosing means for said frame.

References Cited in the file of this patent

UNITED STATES PATENTS

| | | |
|---|---|---|
| 374,181 | Evans | Dec. 6, 1887 |
| 2,118,304 | Hertlein | May 24, 1938 |

FOREIGN PATENTS

| | | |
|---|---|---|
| 625,433 | Great Britain | June 28, 1949 |